(12) United States Patent  
Spadacini

(10) Patent No.: US 9,429,040 B2  
(45) Date of Patent: Aug. 30, 2016

(54) EXPANSION TURBINE

(75) Inventor: Claudio Spadacini, Verbania Suna (IT)

(73) Assignee: EXERGY S.P.A., Bologna (IT)

( * ) Notice: Subject to any disclaimer, the term of this patent is extended or adjusted under 35 U.S.C. 154(b) by 726 days.

(21) Appl. No.: 13/978,162

(22) PCT Filed: Dec. 15, 2011

(86) PCT No.: PCT/IB2011/055694
§ 371 (c)(1),
(2), (4) Date: Aug. 20, 2013

(87) PCT Pub. No.: WO2012/093299
PCT Pub. Date: Jul. 12, 2012

(65) Prior Publication Data
US 2013/0323018 A1    Dec. 5, 2013

(30) Foreign Application Priority Data
Jan. 4, 2011 (IT) ................ MI2011A0001

(51) Int. Cl.
*F01D 25/00* (2006.01)
*F01D 25/28* (2006.01)
(Continued)

(52) U.S. Cl.
CPC ............ *F01D 25/285* (2013.01); *F01D 25/16* (2013.01); *F02C 6/12* (2013.01); *F02C 7/06* (2013.01);
(Continued)

(58) Field of Classification Search
CPC ........ F01D 25/16; F01D 25/285; F02C 6/12; F02C 7/06; F05D 2220/40; F05D 2230/64
USPC ....................................... 415/216.1
See application file for complete search history.

(56) References Cited

U.S. PATENT DOCUMENTS 2,881,972 A   4/1959   Feilden
3,612,628 A   10/1971   Steele
(Continued)

FOREIGN PATENT DOCUMENTS

DE   10 2008 056061 A1   2/2010
FR   2 487 459 A1   1/1982
(Continued)

OTHER PUBLICATIONS

Kuppan, T., "Heat Exchanger Design Handbook", Marcel Dekker Inc., 2000, pp. 1-4.
(Continued)

*Primary Examiner* — Jason Shanske
(74) *Attorney, Agent, or Firm* — Pearne & Gordon LLP

(57) ABSTRACT

An expansion turbine, comprising: a case having an inlet and an outlet for a working fluid; at least one stator (3) installed inside the case; at least one rotor (2) installed inside the case and rotating around a respective revolution axis (X-X); a short-pipe (4) constrained to the case; a mechanical unit (5) installed inside the short-pipe (4). The mechanical unit (5) comprises a bushing (7) and a shaft (6) rotatably installed inside the bushing (7). The shaft (6) is connected to the rotor (2) in removable manner and the whole mechanical unit (5) inclusive of the shaft (6) is extractable from the short-pipe (4) in a unitary form from the side opposite to said rotor (2). The rotor (2) is movable along the axial direction (X-X) between a first configuration, in which the mechanical unit (5) is installed inside the short-pipe (4) and the rotor (2) is spaced from the short-pipe (4), so that the working fluid can revolve it, and a second configuration, in which the mechanical unit (5) is extracted from the short-pipe (4) and the rotor (2) leans against the short-pipe (4) a static seal (18,19).

9 Claims, 2 Drawing Sheets

(51) Int. Cl.
*F01D 25/16* (2006.01)
*F02C 6/12* (2006.01)
*F02C 7/06* (2006.01)

(52) U.S. Cl.
CPC ....... *F05D 2220/40* (2013.01); *F05D 2220/62* (2013.01); *F05D 2230/61* (2013.01); *F05D 2230/64* (2013.01); *F05D 2230/70* (2013.01); *F05D 2230/80* (2013.01); *Y10T 29/49318* (2015.01)

(56) References Cited

U.S. PATENT DOCUMENTS

| 4,285,632 | A | 8/1981 | DeSalve |
| 8,801,369 | B2 | 8/2014 | Gaia et al. |
| 8,864,461 | B2 * | 10/2014 | Gaia ................ F01D 5/005 415/230 |
| 2005/0092307 | A1 | 5/2005 | Middlebrook et al. |
| 2006/0112693 | A1 | 6/2006 | Sundel |
| 2007/0023017 | A1 | 2/2007 | Middlebrook et al. |
| 2007/0227516 | A1 | 10/2007 | Middlebrook et al. |
| 2010/0329854 | A1 | 12/2010 | Middlebrook et al. |
| 2012/0009061 | A1 | 1/2012 | Gaia et al. |

FOREIGN PATENT DOCUMENTS

| GB | 822 173 | A | 10/1959 |
| WO | 01/86130 | A1 | 11/2001 |
| WO | 2005/042924 | A2 | 5/2005 |
| WO | 2006060253 | A1 | 6/2006 |
| WO | 2010/106570 | A1 | 9/2010 |
| WO | 2010106569 | A1 | 9/2010 |

OTHER PUBLICATIONS

Taborek, J., "Double-Pipe and Multitube Heat Exchangers With Plain and Longitudinal Finned Tubes", Heat Transfer Engineering, vol. 18, No. 2, 1997, pp. 34-45.

"ASHRAE Guide and Data Book—Fundamentals and Equipment for 1965 and 1966", American Society of Heating, Refrigerating and Air-Conditioning Engineers, Inc., 1966, pp. 703-704.

Kern, D., "Process Heat Transfer", McGraw-Hill Kogakusha Ltd, 1950, pp. 102-103, 114-117, 522-525.

Shilling, R., et al., "Heat Transfer Technology", The International Journal of Hydrocarbon Engineering, Oct. 1997, pp. 1-8.

Kakac, S., et al., "Heat Exchangers—Selection, Rating, and Thermal Design", Second Edition, CRC Press, 2002, pp. 194, 197.

Bruni, G., "Third Party Observations against European Patent Application No. EP12705427.8", issued by the European Patent Office on Sep. 9, 2014, 88 pages.

Bruni, G., "Third Party Observations against European Patent Application No. EP11810659.0", issued by the European Patent Office on Nov. 7, 2014, 13 pages.

* cited by examiner

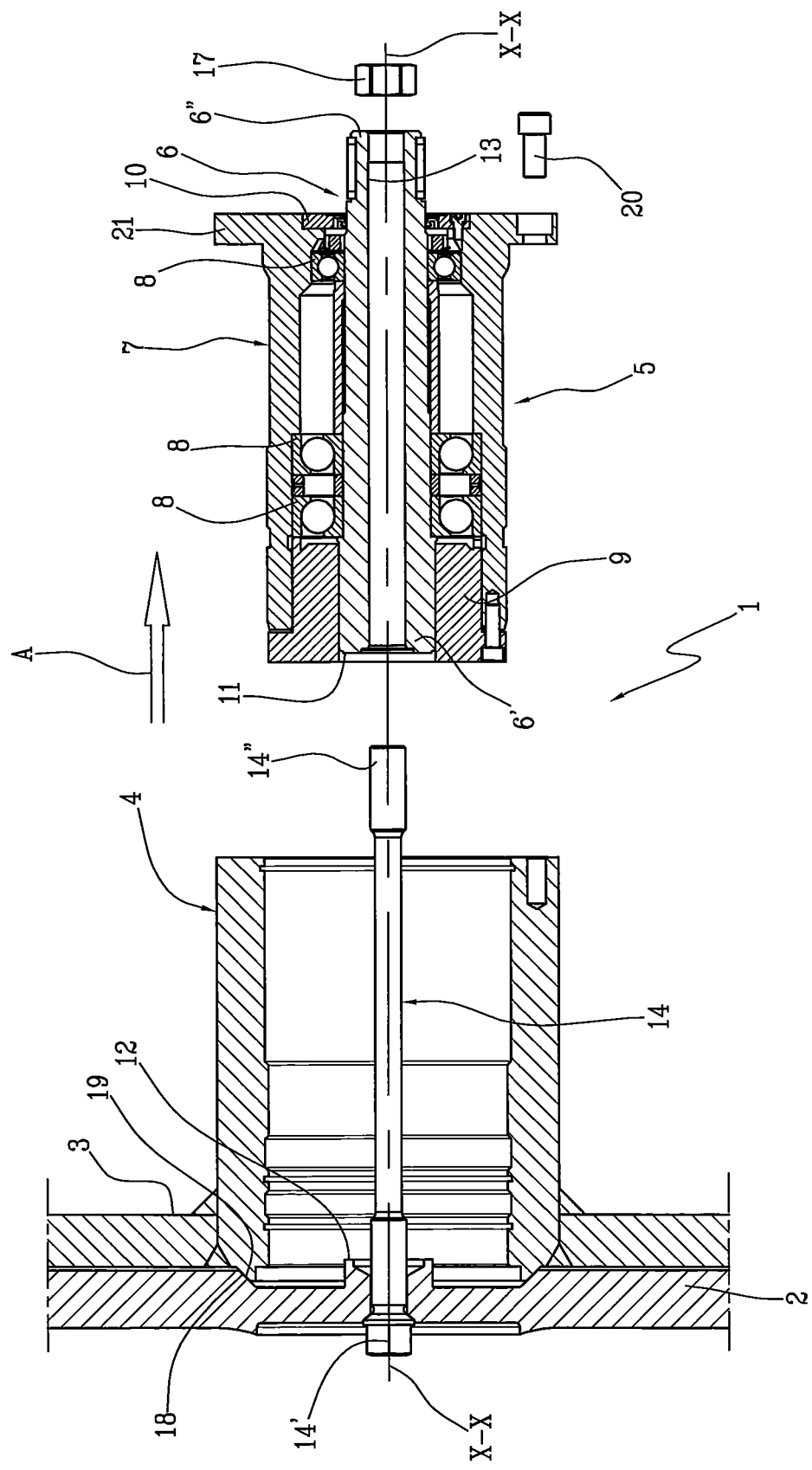

EXPANSION TURBINE

TECHNICAL FIELD

The present invention relates to an expansion turbine, also merely referred to as turbo expander, for producing electrical and/or mechanical energy.

Preferably, the present invention relates to the expansion turbines used in apparatuses for producing energy through the Organic Rankine Cycle (ORC) and/or the Kalina cycle. In these apparatuses, known by themselves, working fluids of the organic type are used instead of the traditional water/steam system, because an organic fluid is able to utilise heat sources at relatively low temperatures, between 100° C. and 300° C., but also at higher temperatures in a more efficient manner. In some cases, a water-ammonia mixture is used and in this case reference is made to Kalina cycles. The ORC conversion apparatuses and/or the Kalina apparatuses therefore are being increasingly more used for wider applications in different sectors, in the geothermal field for example, in industrial energy recovery, in plants for energy production from biomasses and concentrated solar energy, in re-gasifiers, etc.

BACKGROUND ART

Different types of expanders/turbines are known for converting thermal energy into electrical and/or mechanical energy through an Organic Rankine Cycle (ORC) and/or a Kalina cycle. Among the best known types the axial expanders and radial expanders with one or more stages in series are to be mentioned.

Generally, a turbine of known type is made up of a fixed body, referred to as stator, and a movable part, referred to as rotor. The turbine's rotor part consists of a shaft to which one or more expansion stages of the working fluid are fastened. Assembly of the rotor and stator parts is carried out through a mechanical unit ensuring the almost complete nullity of the relative movements of the rotor and stator parts, except for rotation around the revolution axis coincident with the machine's shaft.

The public document WO2010/106570A1 depicts the structure of a turbine for gas and/or steam expansion comprising a case having a stated transit periphery of a working fluid between an inlet opening and an outlet opening, at least one stator, a turbine shaft rotating around an axis and carrying at least one rotor, an outer short-pipe frontally protruding from said case and coaxial with the turbine shaft. Interposed between the outer short-pipe and the turbine is a supporting unit that can be axially extracted from the short-pipe in a unitary form and keeps the shaft fastened to the rotor. Documents U.S. Pat. No. 2,881,972, WO2005/042924, GB822173, DE102008056061, WO01/86130, U.S. Pat. No. 3,612,628, FR2487459, U.S. Pat. No. 4,285,632 show other examples of turbines with extractable parts.

DISCLOSURE OF THE INVENTION

The Applicant has perceived the necessity to improve the structure of the mechanical unit of known expansion turbines, in order to:
facilitate maintenance of the turbine and the related assembling and disassembling operations;
enable maintenance of the mechanical unit without the working fluid being required to be removed from the turbine;
simplify manufacture and limit cost of the mechanical unit;
increase reliability of the mechanical unit and therefore of the turbine as a whole;
increase accuracy in coupling between the stator and rotor parts of the turbine, obtaining reduced plays and therefore high efficiency.

The Applicant has found that the above stated aims can be achieved by providing a turbine shaft that can be separated from the rotor and extracted together with the mechanical unit consisting of bearings and seals.

More specifically, in a first aspect, the present invention relates to an expansion turbine according to claim 1.

Preferably, but not exclusively, the expansion turbine according to the invention is suitable for use in machines operating through the Organic Rankine Cycle and/or the Kalina cycle, in which the work temperatures are relatively low (100° C.-300° C.) and the rotation speeds are relatively moderate (1000-4000 rpm).

The present invention can further have one or more of the preferred features hereinafter described.

Preferably the turbine comprises a self-centring joint connecting the shaft and the rotor and, more preferably, the self-centring joint is of the toothed-coupling type (of the Hirth type, for example). The teeth on the rotor and the shaft ensure perfect centring of the rotor relative to the shaft without requiring the same to be re-balanced at each assembling/disassembling.

Preferably, the turbine comprises a tie-rod inserted in an axial opening of the shaft; said tie-rod having an end connected to said rotor and being integral with the rotor in an extraction direction of the mechanical unit from the short-pipe. The tie-rod enables the rotor to be clamped against the shaft making them integral (by means of the toothed-coupling joint) in a simple and quick manner.

In accordance with a preferred embodiment, the turbine comprises a spherical coupling connecting the tie-rod and the rotor, in order to ensure a perfect joint. The tightening action is carried out by means of a nut, after pre-tightening of the tie-rod in such a manner as to avoid twisting moments on the rotor during the maintenance operations.

The turbine further comprises devices for locking the rotor against the short-pipe when said rotor is in the second configuration.

The disassembling operations can therefore be carried out without emptying the turbine case. In particular, disassembling takes place by: moving the mechanical unit and the rotor backwards relative to the short-pipe until bringing said rotor against the short-pipe at the static seal; locking the rotor against the short-pipe; removing the mechanical unit from the short-pipe while the rotor is being locked against said short-pipe. Thus any leakage of the working fluid and/or the air that has entered the inner circuit again is avoided, which will enable very quick maintenance operations.

Preferably, the mechanical unit further comprises a sealing device disposed between the bushing and the shaft at an end of said shaft connected to the rotor.

Preferably, the mechanical unit further comprises an oil seal disposed between the bushing and the shaft at an end of said shaft opposite to the rotor.

Preferably, the mechanical unit comprises rolling bearings rotatably supporting the shaft in the bushing.

Use of the rolling bearings is possible, due to the low rotation speeds and the reduced mechanical stresses belonging to the ORC and Kalina cycles resulting from the reduced enthalpic changes to which turbines usually have to operate. The rolling bearings are characterised by the absence of intrinsic plays and the operate with the rotation centre coincident with the geometric centre of the bearing itself. Adoption of rolling bearings therefore enables very reduced plays to be adopted and consequently high efficiency to be reached in working.

Further features and advantages will become more apparent from the detailed description of a preferred but not exclusive embodiment of an expansion turbine in accordance with the present invention.

BRIEF DESCRIPTION OF THE DRAWINGS

This description will be set out hereinafter with reference to the accompanying drawings, given by way of non-limiting example, in which:

FIG. 2 depicts the portion seen in FIG. 1 partly disassembled.

DETAILED DESCRIPTION OF THE PREFERRED EMBODIMENTS OF THE INVENTION

Figure 1:
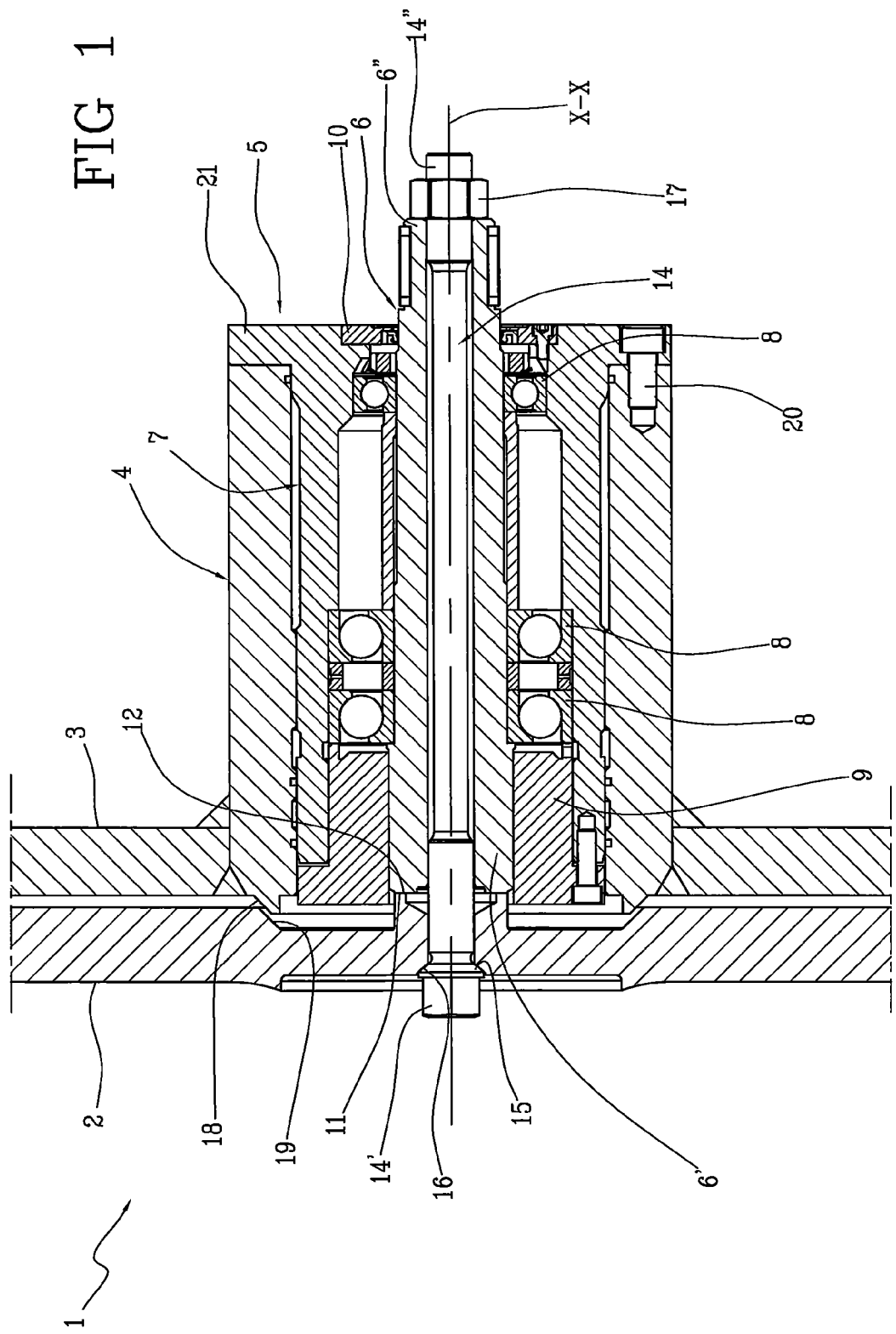
FIG. 1 is a section view of a portion of an expansion turbine according to the present invention.

With reference to the drawings, an expansion turbine according to the present invention has been generally identified with reference numeral 1.

The expansion turbine 1 shown is of the type used in apparatuses for generating mechanical and/or electric energy through the Organic Rankine Cycle (ORC) and/or the Kalina cycle.

Turbine 1 comprises a rotor or rotary disc 2 and a stator 3 only diagrammatically shown in the accompanying figures. Rotor 2 indifferently refers to axial and/or radial and/or mixed flow turbines. Rotor 2 and stator 3 are placed in a case, known by itself and therefore not further described or shown, having an inlet and an outlet for a working fluid (such as preferably ORC or water/ammonia but even water/steam).

Stator 3 is connected to a short-pipe 4 integral with the case. In the drawings, stator 3 is shown as welded to the short-pipe 4, but it can also be possibly coupled by flange and bolts and other coupling.

Mounted inside the short-pipe 4 in a removable manner is a mechanical unit 5 carrying a shaft 6 extending along a revolution axis "X-X" and free to rotate around said axis "X-X" together with rotor 2 to which it is connected at a first end 6' thereof. In greater detail, the mechanical unit 5 comprises a bushing 7 coaxial with the short-pipe 4. The bushing 7 and/or short-pipe 4 further have grooves and/or splines preventing relative rotation between the bushing 7 and short-pipe 4 around the revolution axis "X-X".

Mounted in the bushing 7 are ball bearings 8 supporting the shaft 6 in such a manner that it is free to rotate around the revolution axis "X-X" inside said bushing 7. In the non-limiting example shown, the mechanical unit 5 comprises two side-by-side bearings 8 disposed at an axially intermediate position of the bushing 7 and a bearing 8 placed at an end of said bushing 7 close to a second end 6" of shaft 6.

The mechanical unit 5 further comprises a sealing device or gland 9 disposed between the bushing 7 and shaft 6 at the first end 6' of shaft 6 and an oil seal 10 disposed between the bushing 7 and shaft 6 at the second end 6" of shaft 6.

Formed on the first end 6' of shaft 6 is a tooth set 11 that, when turbine 1 is assembled and ready to work, is engaged with a tooth set 12 formed on rotor 2. The two tooth sets 11, 12 define a self-centring joint of the Hirth type or the like.

Shaft 6 has an axial opening 13 inside which a tie-rod 14 is housed. The tie-rod 14 has a head 14' projecting from the first end 6' of shaft 6 and is connected to rotor 2. The tie-rod 14 is introduced into a central hole of rotor 2 and the head 14' has a spherical surface 15 lying against a spherical surface 16 of rotor 2 facing away from the mechanical unit 5. The tie-rod 14 has a final end 14" opposite to the head 14' and protruding from the second end 6' of shaft 6. A nut 17 screwed down on the final end 14" tightens rotor 2 against shaft 6, the teeth of the two tooth sets 11, 12 meshing with each other so that rotor 2 and shaft 6 rotate being integral with each other.

Formed on the face of the short-pipe 4 facing rotor 2 is a conical surface 18 facing a conical surface 19 present on rotor 2.

When turbine 1 is assembled in a correct manner for working (FIG. 1), the bushing 7 is inserted and locked in the short-pipe 4. Shaft 6 is integral with rotor 2 (by means of the toothed joint 11, 12) and rotor 2 is spaced from stator 3. In particular, the two conical surfaces 18,19 face each other while being mutually spaced apart.

To disassemble the mechanical unit 5, first screws 20 are extracted so as to remove the axial block between the bushing 7 and short-pipe 4.

Subsequently, the mechanical unit 5, rotor 2 and tie-rod 14 (all still mutually integral along the axial direction) are moved until bringing the conical surface 19 of rotor 2 into abutment against the conical surface of the short-pipe 4 and generating a static seal capable of preventing leakage of the working fluid contained in the case.

At this point, the rotor 2, short-pipe 4 and stator 3 are locked against each other by suitable devices not shown.

Nut 17 is subsequently removed from the tie-rod 14 and it is therefore possible to extract the whole mechanical unit 5 (consisting of bushing 7, shaft 6, bearings 8, gland 9 and oil seal 10) in a unitary manner by slipping it off the short-pipe 4 from the side opposite to rotor 2 and simultaneously extracting the tie-rod 14 (that remains constrained to rotor 2) from the axial opening 13 of shaft 6 (FIG. 2).

The invention claimed is:

1. An expansion turbine, comprising:
a case having an inlet and an outlet for a working fluid;
at least one stator (3) installed inside the case;
at least one rotor (2) installed inside the case and rotating around a respective revolution axis (X-X);
a short-pipe (4) constrained to the case;
a mechanical unit (5) installed inside the short-pipe (4); said mechanical unit (5) comprising a bushing (7) and a shaft (6) rotatably installed inside the bushing (7); said shaft (6) being rotated around the revolution axis (X-X) and connected to the rotor (2); wherein the shaft (6) is connected to the rotor (2) in removable manner and the whole mechanical unit (5) is extractable from the short-pipe (4) from the side opposite to said rotor (2);
wherein the rotor (2) is movable along the axial direction (X-X) between a first configuration, in which the mechanical unit (5) is installed inside the short-pipe (4) and the rotor (2) is spaced from the short-pipe (4), so that the working fluid can revolve the rotor, and a second configuration, in which the mechanical unit (5) is extracted from the short-pipe (4) and the rotor (2) leans against the short-pipe (4) at a static seal (18, 19).

2. A The turbine as claimed in claim 1, comprising a self-centering joint (11, 12) connecting the shaft (6) and the rotor (2).

3. A The turbine as claimed in claim 2, wherein the self-centering joint (11, 12) is tooth-coupled.

4. The turbine as claimed in claim 1, comprising a tie-rod (14) inserted into an axial opening (13) of the shaft (6); said tie-rod (14) having an end (14') connected to said rotor (2) and being integral with the rotor (2) along an extraction direction (A) of the mechanical unit (5) from the short-pipe (4).

5. The turbine as claimed in claim 4, comprising a spherical coupling (15, 16) connecting the tie-rod (14) and the rotor (2).

6. The turbine as claimed in claim 1, wherein the rotor (2) is locked against the short-pipe (4) when said rotor (2) is in the second configuration.

7. The turbine as claimed in claim 1, wherein the mechanical unit (5) further comprises a gland (9) placed between the bushing (7) and the shaft (6) at an end (6') of said shaft (6) connected to the rotor (2), and an oil seal (10) placed between the bushing (7) and the shaft (6) at an end (6") of said shaft (6) opposite to the rotor (2).

8. The turbine as claimed in claim 1, wherein the mechanical unit (5) comprises rolling bearings (8) rotatably supporting the shaft (6) inside the bushing (7).

9. A method for disassembling an expansion turbine, comprising the following steps:
   providing an expansion turbine according to claim 1;
   moving back the mechanical unit (5) and the rotor (2) with respect to the short-pipe (4) until bringing said rotor (2) against said short-pipe (4) at a static seal (18, 19);
   locking the rotor (2) against the short-pipe (4); and
   extracting the mechanical unit (5) from the short-pipe (4) while the rotor (2) is being locked against said short-pipe (4).

* * * * *